(No Model.) 3 Sheets—Sheet 1.

P. SAINSEVAIN.
GRAPE CRUSHER AND STALKER.

No. 301,629. Patented July 8, 1884.

(No Model.) 3 Sheets—Sheet 2.

P. SAINSEVAIN.
GRAPE CRUSHER AND STALKER.

No. 301,629. Patented July 8, 1884.

Witnesses:
Geo. H. Strong.
G. H. Nourse.

Inventor,
P. Sainsevain
By Dewey & Co.
Attorneys (No Model.) 3 Sheets—Sheet 3.
P. SAINSEVAIN.
GRAPE CRUSHER AND STALKER.
No. 301,629. Patented July 8, 1884.
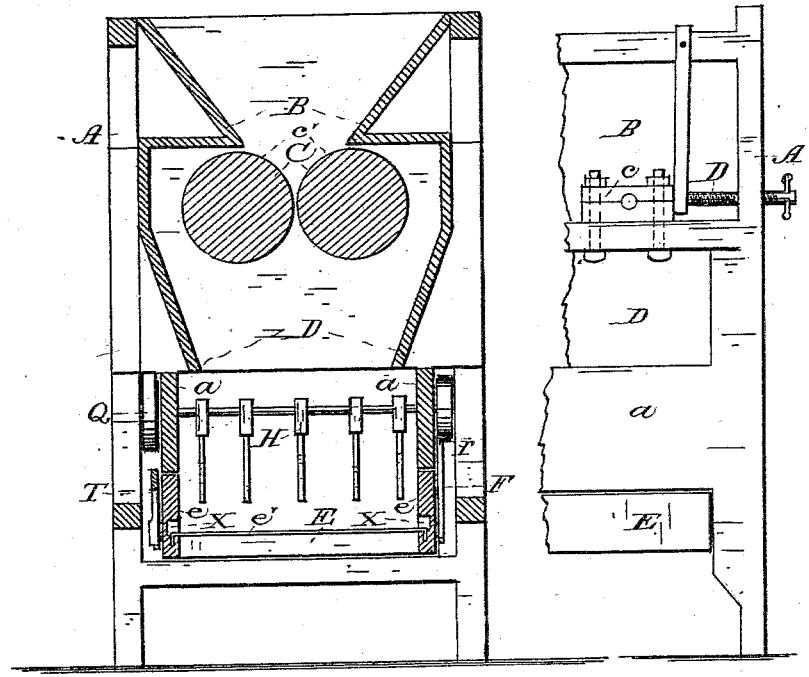
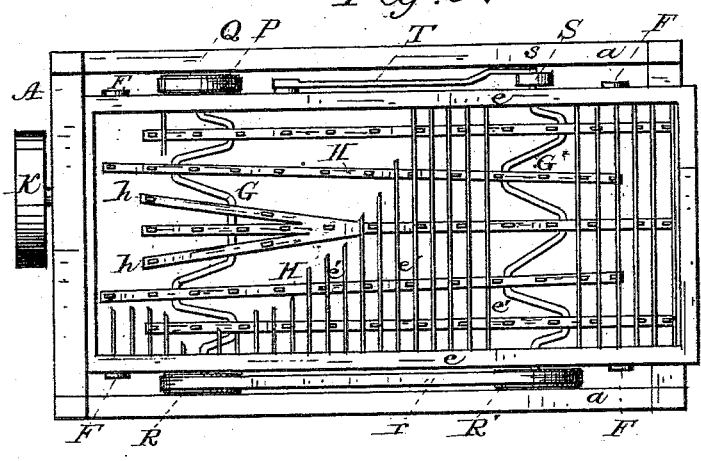

UNITED STATES PATENT OFFICE.

PIERRE SAINSEVAIN, OF SAN JOSÉ, CALIFORNIA.

GRAPE CRUSHER AND STALKER.

SPECIFICATION forming part of Letters Patent No. 301,629, dated July 8, 1884.

Application filed May 1, 1884. (No model.)

*To all whom it may concern:*

Be it known that I, PIERRE SAINSEVAIN, of San José, county of Santa Clara, and State of California, have invented an Improvement in Grape Crusher and Stalker; and I hereby declare the following to be a full, clear, and exact description thereof.

My invention relates to a new and useful machine for crushing the grapes and removing the stalks or stems; and it consists in two novel revolving crushing-rollers, an underlying vibrating sieve, and an intervening alternately-acting series of reciprocating rakes operating over the sieve; and it consists in the mechanism by which the parts have imparted to them their proper motions, and in certain details of construction, all of which I shall hereinafter fully explain.

The object of my invention is to provide a simple and effective machine for crushing the grapes and removing from them the stalks or stems, or such portion of them as may be desirable.

Figure 1:
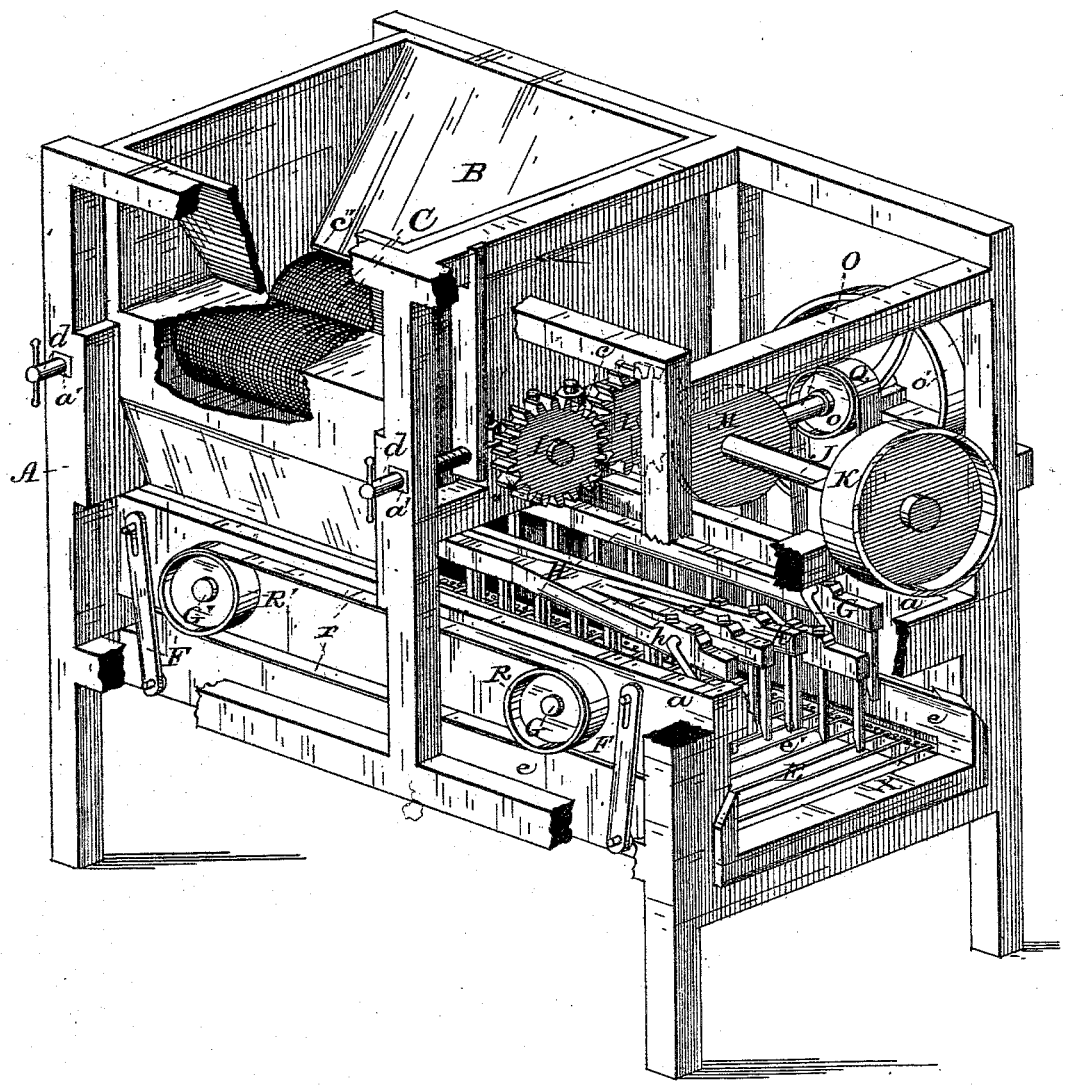
Figure 2:
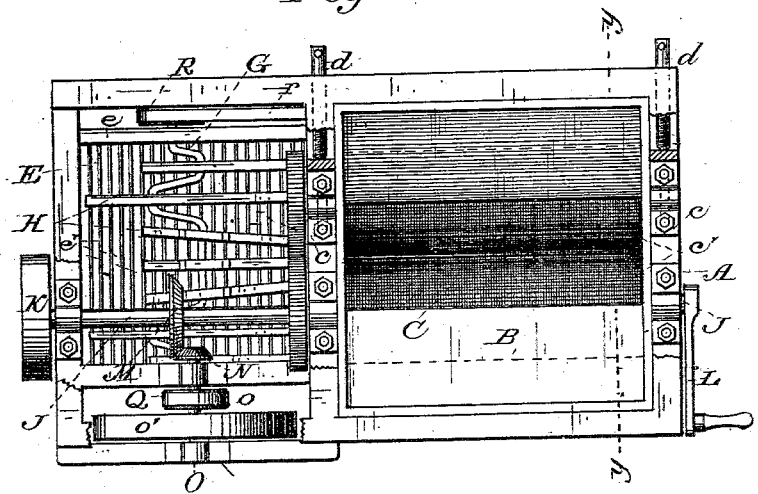
Figure 3:
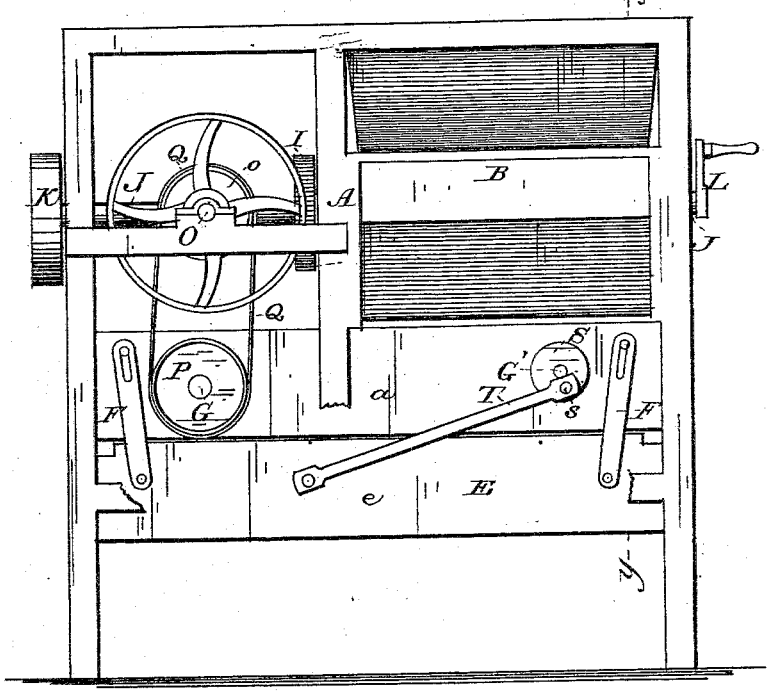

Referring to the accompanying drawings, Figure 1 is a perspective view of my grape crusher and stalker. Fig. 2 is a plan of the top of my machine. Fig. 3 is a side elevation. Fig. 4 is a transverse vertical section on the line $yy$, Fig. 2. Fig. 5 is a plan of the bottom, looking up, of my machine. Fig. 6 is a portion of an end elevation.

A is a frame, in the top of which is a hopper, B.

C C are two crushing-rollers, mounted under the throat of the hopper.

D is a guide-chute under the rollers.

E is a horizontal sieve, consisting of side pieces, $e$, and transverse-spaced bars $e'$. This sieve is suspended by hangers F from side pieces, $a$, of the frame. Mounted between these side pieces are crank-shafts G G', upon the cranks of which are secured the rakes H, consisting of suitable bars and teeth. I have here shown the shafts G G' as having five cranks, the adjacent ones being about one hundred and eighty degrees apart, though of course I could vary that distance, to make the reciprocating movement of each rake take place at different times from the times of movement of the others. In the present case, however, the central rake and the two side ones move together, and the intermediates ones do likewise. The central rake has two divergent branches, $h$, at its rear, to insure the complete raking away of the stems at the rear of the frame and to prevent any bunching at that point.

Upon the inner ends of the axles of the crushing-rollers are engaging-gears I, one of which is on a shaft, J, to which the power is applied by a pulley, K; or, as another means of applying the power, I have a crank, L, on one of the axles at the other end.

Upon shaft J is a bevel-pinion, M, which meshes with a bevel-pinion, N, on a counter-shaft, O, which carries a belt-pulley, $o$, and fly-wheel, $o'$.

Upon an end of the crank-shaft G is a pulley, P, from which a belt, Q, extends to pulley $o$, whereby motion is transmitted to said crank-shaft. Upon the other end of the crank-shaft is a pulley, R, and upon the corresponding end of the crank-shaft G' is a pulley, R', from which a belt, $r$, extends to pulley R, whereby motion is transmitted to the crank-shaft G'. Upon the other end of the crank-shaft G' is a crank-wheel, S, with the crank-pin $s$ of which a pitman, T, is connected, the other or rear end of which is pivoted to the side of the sieve, whereby a vibratory motion is imparted to said sieve.

The operation of the machine is as follows: The unstalked grapes are fed into the hopper B, through the throat of which they pass, and, falling beetween the crushing-rollers C, the grapes are crushed and the stalks or stems torn from them. They fall thence through chute D and between the rakes upon the vibrating sieve E, whose motion has a tendency to separate the crushed grapes from the stems. The grapes and juice pass down through the sieve into suitable receptacles below. The reciprocating rakes, operating over the surface of the sieve, rake the stems and stalks backward and discharge them at the open rear end of the machine. In some cases it may be required to rake off the whole of the stems, and in others some of them should be allowed to fall through the sieve with the grapes. This can be accomplished by widening or lessening the spaces between the bars $e'$ of the sieve. When the bars are placed close together, the stems will not fall through at all, while if they are separated more some of the shorter ones may fall through. The way I accomplish this end is by making the bars $e'$ adjustable to or from each other. A good way to do this is to make longitudinal grooves $x$, with bottom holes in the inner surfaces of the sides of the sieve, into any of which the ends of the bars are fitted.

I also make the crushing-rollers adjustable to or from each other, in order to crush finer or coarser. This I do by making the journal-boxes $c$ of one of the rollers adapted to slide on their supports, and I effect the movement by means of screws $d$ passing through stationary nuts $a'$ into the journal-boxes. I cover the roller C with a net-work of wire, $c'$, which catches and pulls the grapes down between the rollers.

Having thus described my invention, what I claim as new, and desire to secure by Letters Patent, is—

1. In a grape crusher and stalker, crushing-rollers for crushing the grapes and tearing from them the stalks, an underlying sieve to receive the crushed grapes and separated stalks, and an intervening reciprocating rake or rakes operating over the sieve to rake off the stalks, substantially as herein described.

2. In a grape crusher and stalker, crushing-rollers for crushing the grapes and tearing from them the stalks, an underlying vibrating or shaking sieve to receive the crushed grapes and separated stalks, and an intervening reciprocating rake or rakes operating over the sieve to rake off the stalks, substantially as herein described.

3. In a grape crusher and stalker, crushing-rollers for crushing the grapes and tearing from them the stalks, an underlying vibrating or shaking sieve to receive the crushed grapes and separated stalks, and an intervening series of alternately-reciprocating rakes operating over the sieve to rake off the stalks, substantially as herein described.

4. In a grape crusher and stalker, the hopper B and crushing-rollers C C in or under its throat, and the underlying vibrating sieve E, in combination with the intervening rakes, H, and the crank-shafts G G', upon the cranks of which said rakes are mounted, substantially as herein described.

5. In a grape crusher and stalker, the hopper B, crushing-rollers C C, chute D, and the underlying vibrating sieve E, consisting of spaced bars $e'$, in combination with the rakes H and crank-shafts G G', substantially as described.

6. In a grape crusher and stalker, the hopper B and crushing-rollers C C, in combination with the sieve E, consisting of spaced or separated bars $e'$, adapted to be adjusted closer together or farther apart, and the reciprocating rake H, operating over the surface of the sieve, substantially as described.

7. In a grape crusher and stalker, the hopper B and the rollers C C, adapted to be adjusted with relation to each other by means of the sliding journal-boxes $c$, screws $d$, and nuts $a'$, in combination with the underlying sieve E, and the intervening reciprocating rakes, H, substantially as herein described.

8. In a grape crusher and stalker, the crushing-rollers C C, underlying loosely-suspended sieve E, and intervening rakes, H, in combination with the mechanism, as described, by which the rollers are rotated, the sieve vibrated, and the rakes reciprocated, consisting of a pulley, K, for applying power to rotate one of the rollers, the gears I on the axles of the rollers, the shaft J, bevel-pinions M N, counter-shaft O, pulleys $o$ P R R', belts Q $r$, crank-shafts G G', crank-wheel S, and pin $s$, and pitman T, all arranged and operating substantially as herein described.

9. In a grape crusher and stalker, as herein described, the sieve E, in combination with the series of reciprocating rakes H, the center rake of which has diverging branches $h$ at its rear end, substantially as and for the purpose herein described.

PIERRE SAINSEVAIN.

Witnesses:
CHAS. E. ALLEN,
GEO. M. YOELL.